(12) United States Patent
Cowan et al.

(10) Patent No.: US 12,288,455 B2
(45) Date of Patent: Apr. 29, 2025

(54) WILDFIRE IDENTIFICATION IN IMAGERY

(71) Applicant: X Development LLC, Mountain View, CA (US)

(72) Inventors: Eliot Julien Cowan, Atherton, CA (US); Avery Noam Cowan, Atherton, CA (US); Akshina Gupta, Warren, NJ (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 18/589,385

(22) Filed: Feb. 27, 2024

(65) Prior Publication Data
US 2024/0331518 A1    Oct. 3, 2024

Related U.S. Application Data

(63) Continuation of application No. 17/368,256, filed on Jul. 6, 2021, now Pat. No. 12,080,137.

(51) Int. Cl.
*G08B 17/00* (2006.01)
*G06F 16/29* (2019.01)
(Continued)

(52) U.S. Cl.
CPC .......... *G08B 17/005* (2013.01); *G06F 16/29* (2019.01); *G06T 7/77* (2017.01); *G06T 11/20* (2013.01);
(Continued)

(58) Field of Classification Search
CPC ......... G08B 17/005; G06T 7/77; G06T 11/20; G06T 2207/10032; G06T 2210/12; G06F 16/29
See application file for complete search history.

(56) References Cited

U.S. PATENT DOCUMENTS

| 8,769,023 B2 * | 7/2014 | Lau ................... H04M 3/42374 709/221 |
| 10,733,671 B1 * | 8/2020 | Hakimi-Boushehri ...................... G06Q 50/16 |

(Continued)

OTHER PUBLICATIONS

Benkraouda et al., "Belonging probability inverse image approach for forest fire detection," African Journal of Ecology, Nov. 2013, 52(3):363-369.

(Continued)

*Primary Examiner* — Thomas D Alunkal
(74) *Attorney, Agent, or Firm* — Fish & Richardson P.C.

(57) ABSTRACT

Methods, systems, and apparatus, including computer programs encoded on computer storage media, for identifying wildfire in satellite imagery. In some implementations, a server obtains a satellite image of a geographic region and a date corresponding to when the satellite image was generated. The server determines a number of pixels in the satellite image that are indicated as on fire. The server obtains satellite imagery of the geographic region from before the date. The server generates a statistical distribution from the satellite imagery. The server determines a likelihood that the satellite image illustrates fire based on a comparison of the determined number of pixels in the satellite image that are indicated as on fire to the generated statistical distribution. The server can compare the determined likelihood to a threshold. In response to comparing the determined likelihood to the threshold, the server provides an indication that the satellite image illustrates fire.

20 Claims, 4 Drawing Sheets

(51) Int. Cl.
*G06T 7/77* (2017.01)
*G06T 11/20* (2006.01)

(52) U.S. Cl.
CPC ............... *G06T 2207/10032* (2013.01); *G06T 2210/12* (2013.01)

(56) References Cited

U.S. PATENT DOCUMENTS

| | | | | |
|---|---|---|---|---|
| 10,861,320 | B2* | 12/2020 | Martin | H04W 4/02 |
| 11,184,083 | B2* | 11/2021 | De Rosa | H04B 7/18506 |
| 11,275,989 | B2* | 3/2022 | Tschernezki | G06N 3/044 |
| 2015/0278603 | A1* | 10/2015 | Boriah | G06V 20/13 382/103 |
| 2016/0132714 | A1* | 5/2016 | Pennypacker | G06F 18/217 382/103 |
| 2018/0336452 | A1 | 11/2018 | Tschernezki et al. | |
| 2020/0159397 | A1* | 5/2020 | Tohidi | G06F 3/04847 |
| 2021/0110136 | A1* | 4/2021 | Ganti | G06V 10/764 |
| 2021/0110691 | A1* | 4/2021 | Heinonen | G08B 29/188 |

OTHER PUBLICATIONS

Goes-r.gov [online], "Beginner's Guide to GOES-R Series Data," Feb. 8, 2021, retrieved on Feb. 12, 2024, retrieved from URL<https://www.goes-r.gov/downloads/resources/documents/Beginners_Guide_to_GOES-R_Series_Data.pdf/>, 36 pages.

International Search Report and Written Opinion in International Appln. No. PCT/US2022/034462, dated Oct. 12, 2022, 17 pages.

Luu-Due et al., "Wildfire smoke detection based on co-occurrence matrix and dynamic feature," 2016 International Conference on Advanced Technologies for Communications (ATC), Oct. 2016, pp. 277-281.

Office Action in Australian Appln. No. 2022306374, dated Jan. 29, 2024, 4 pages.

Decision to Grant Patent in Japanese Appln. No. 2023-578092, dated Jul. 2, 2024, 6 pages (with machine translation).

Office Action in Australian Appln. No. 2022306374, dated Jun. 27, 2024, 6 pages.

Reents, "Detection and characterization of forest disturbances in California, " Thesis for the degree of Master of Science in Geography, University of Illinois at Urbana—Champaign, 2016, 94 pages.

Shin et al., "Using UAV multispectral images for classification of forest burn severity A case study of the 2019 Gangneung forest fire, " Forests, Nov. 14, 2019, 10(11):1025.

Ali et al., "Remote Sensing for Space-Time Mapping of Smog in Punjab and Identification of the Underlying Causes Using Geographic Information System (R-SMOG)," Food and Agriculture Organization of the United Nations, Feb. 15, 2020, 132 pages.

Office Action in Australian Appln. No. 2025200161, mailed on Feb. 25, 2025, 6 pages.

Office Action in Canadian Appln. No. 3,224,231, mailed on Mar. 3, 2025, 6 pages.

Office Action in Chile Appln. No. 202400022, mailed on Mar. 4, 2025, 38 pages (with English translation).

Notice of Acceptance for Patent Application in Australian Appln. No. 2022306374, dated Nov. 8, 2024, 10 pages.

* cited by examiner

WILDFIRE IDENTIFICATION IN IMAGERY

CROSS REFERENCE TO RELATED APPLICATION

This application is a continuation of U.S. patent application Ser. No. 17/368,256, filed on Jul. 6, 2021. The disclosure of the prior application is considered part of and is incorporated by reference in the disclosure of this application.

TECHNICAL FIELD

This specification relates generally to computer simulations, and one particular implementation relates to determining an indication of wildfire using statistical distributions and satellite imagery.

BACKGROUND

Wildfires, which can include bushfire, wild land fire, rural fire, or others, can occur in various geographic regions. A wildfire can originate in one geographic region and spread to another geographic region over a period of time. Wildfires may be caused by factors such as climate, vegetation, and even human activity, to name a few examples.

SUMMARY

The techniques described in this specification can identify wildfire in satellite imagery. In particular, a server can generate a statistical distribution that analyzes pixels in the satellite imagery and determines a likelihood that the satellite imagery illustrates wildfire. In some implementations, these techniques enable the server to distinguish wildfire from noise in satellite imagery. In some cases, the satellite imagery, which can include one or more satellite images, can include noise that typical systems may identify as wildfire. The noise can correspond to glare off a geographical feature, e.g., river or lake, or glare off a windshield of a vehicle or glare off a window of a building or residential property, to name a few examples. Specifically, the techniques described in this specification enable the server to distinguish whether that noise is in fact wildfire with high confidence.

The techniques for identifying whether a satellite image includes wildfire are important because this identification can be utilized and required by other applications. For example, the server can provide the identification that a corresponding satellite image includes wildfire to a machine learning algorithm that can be trained on identifying wildfire from satellite imagery alone. Additionally, the server can provide the indication that a satellite image includes wildfire to a graphical user interface that can display multiple satellite images stitched together to illustrate multiple regions that may or may not include wildfire. An external user can review the graphical user interface and can make determinations about whether to notify authorities about a detected wildfire in real-time or in case individuals want to analyze reasons as to why certain geographic locations may be more inclined to wildfires than others geographic locations.

In some implementations, the server can receive a satellite image of a geographic location and a date that corresponds to when the satellite image was captured by a satellite. The date can indicate a particular date in the lifespan of the wildfire, e.g., a start date, an end date, or some date in between the start and end date. The geographic region can be defined by and be accompanied with locational data that include, for example, longitudinal and latitudinal coordinates as well as regions or areas surrounding these positional coordinates.

The server can communicate with a satellite images database to obtain satellite imagery of various geographical regions. The satellite imagery database can store satellite imagery, such as infrared and other satellite data, of the various geographical regions of the earth over various periods of time. The satellite imagery can also include other processed satellite imagery products, e.g., MODIS MCD45A1, which contains burning and quality assurance information on a per-pixel basis. The satellite imagery database can index the satellite imagery by a number of factors, e.g., locational data, time, days, and bounding regions of the geographic areas.

The server can identify and retrieve satellite imagery using the locational data associated with the geographic region and the date when the satellite imagery was taken by the satellite. In particular, the server can provide the locational data and the date to the satellite imagery database and obtain satellite imagery from a time period before the provided date. The server may return satellite imagery that illustrates the geographic region over the time period.

In some implementations, the server can generate a statistical distribution based on the obtained satellite imagery of the particular geographic region from the time period previous to the date associated with the image. As will be further described below, the server can generate a baseline of satellite imagery that corresponds to a time period prior to the input date, each image in the baseline illustrating the geographical region over the defined time period. Once the server has generated the statistical distribution, the server can determine whether the satellite imagery illustrates wildfire.

In building the statistical distribution, the server can select satellite imagery that corresponds to a time period of the geographical region prior to the input date, e.g., a time period of the geographical region prior to three months behind the input date. The three months behind the input date is selected to ensure the baseline imagery for the statistical distribution is free from and does not include fire pixels. Moreover, the server can filter satellite imagery within a smallest known perimeter of the wildfire. This will be further explained below. The server can compare the satellite imagery to the generated statistical distribution to identify whether the satellite imagery illustrates wildfire.

In some implementations, the server can provide the indication whether the satellite imagery illustrates wildfire for output. The server can provide the indication to a client device over a network, to a machine learning pipeline, to another process analyzing wildfire, and even, to storage for later usage.

In one general aspect, a method is performed by a server. The method includes: obtaining, by a server, a satellite image of a geographic region and a date corresponding to when the satellite image was generated; determining, by the server, a number of pixels in the satellite image that are indicated as on fire; obtaining, by the server, satellite imagery of the geographic region from before the date when the satellite image was generated; generating, by the server, a statistical distribution from the satellite imagery; determining, by the server, a likelihood that the satellite image illustrates fire based on a comparison of the determined number of pixels in the satellite image that are indicated as on fire to the generated statistical distribution; comparing, by the server, the determined likelihood to a threshold; in response to comparing the determined likelihood to the threshold, providing, by the server, an indication that the satellite image illustrates fire.

Other embodiments of this and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The foregoing and other embodiments can each optionally include one or more of the following features, alone or in combination. For example, one embodiment includes all the following features in combination.

In some implementations, the method includes wherein obtaining the satellite imagery of the geographic region from before the date when the satellite image was generated further comprises: obtaining, by the server, a location that describes the geographic region; providing, by the server, the location that describes the geographic region and the date corresponding to when the satellite image was generated to a satellite images database; and in response to providing the location and the date to the satellite images database, obtaining, by the server, the satellite imagery that illustrates the geographic region from a time period prior to the date.

In some implementations, the method includes wherein generating the statistical distribution from the satellite imagery further comprises: selecting, by the server, a subset of satellite imagery from the obtained satellite imagery, wherein the selecting comprises: identifying, by the server, a time period to generate the statistical distribution, the time period corresponding to a period prior to the date the satellite image was captured; selecting, by the server, the subset of imagery from the satellite imagery based on the time period; determining, by the server, an indication if one or more pixels from the subset of satellite imagery illustrates fire; and adjusting, by the server, the subset of satellite imagery by comparing the one or more pixels that illustrates fire to a threshold value if one or more satellite imagery of the subset illustrates fire.

In some implementations, the method includes wherein generating the statistical distribution from the satellite imagery further comprises: in response to adjusting the subset of satellite imagery, generating, by the server, one or more parameters of the statistical distribution by: determining, by the server, a number of pixels on each day of the subset of satellite imagery that illustrate fire; determining, by the server, an average of the number of pixels on each day of the subset of satellite imagery that illustrate fire; and generating, by the server, the statistical distribution by setting the determined average to the one or more parameters.

In some implementations, the method includes wherein determining the number of pixels in the satellite image that are indicated as on fire further comprises one or more of: determining, by the server, the number of pixels in the satellite image that are indicated as on fire based on a fire detection algorithm executing over one or more pixels within a bounding box cropped on the satellite image; or determining, by the server, the number of pixels within the bounding box in the satellite image that are indicated as on fire based on comparing an intensity value for each pixel to a second threshold value; and in response to determining a set number of pixels from the number of pixels within the bounding box are each greater than the second threshold value, identifying, by the server, the set number of pixels as pixels illustrating wildfire in the obtained satellite image.

In some implementations, the method includes wherein determining the likelihood or likelihood proxy that the satellite image illustrate fire based on the comparison of the determined number of pixels in the satellite image that are indicated as on fire to the generated statistical distribution further comprises providing, by the server, data representing the set number of pixels as pixels illustrating wildfire in the obtained satellite image as input to the generated statistical distribution.

In some implementations, the method includes in response to comparing the determined likelihood to the threshold, determining, by the server, whether the satellite image illustrates wildfire depending on a side of the threshold the likelihood lies.

In some implementations, the method includes in response to comparing the determined likelihood to the threshold, determining, by the server, whether the satellite image illustrates wildfire depending on a side of the threshold the likelihood lies.

In some implementations, the method includes wherein providing the indication that the satellite image illustrates fire further comprises providing, by the server, the satellite image and a corresponding indication that the satellite image illustrates fire to a graphical user interface (GUI) on a display, the GUI illustrates multiple satellite images stitched together over various geographical regions with one or more indications of fire pixels in the multiple satellite images.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements. The components shown here, their connections and relationships, and their functions, are meant to be examples only, and are not meant to limit the implementations described and/or claimed in this document.

DETAILED DESCRIPTION

Figure 1A:
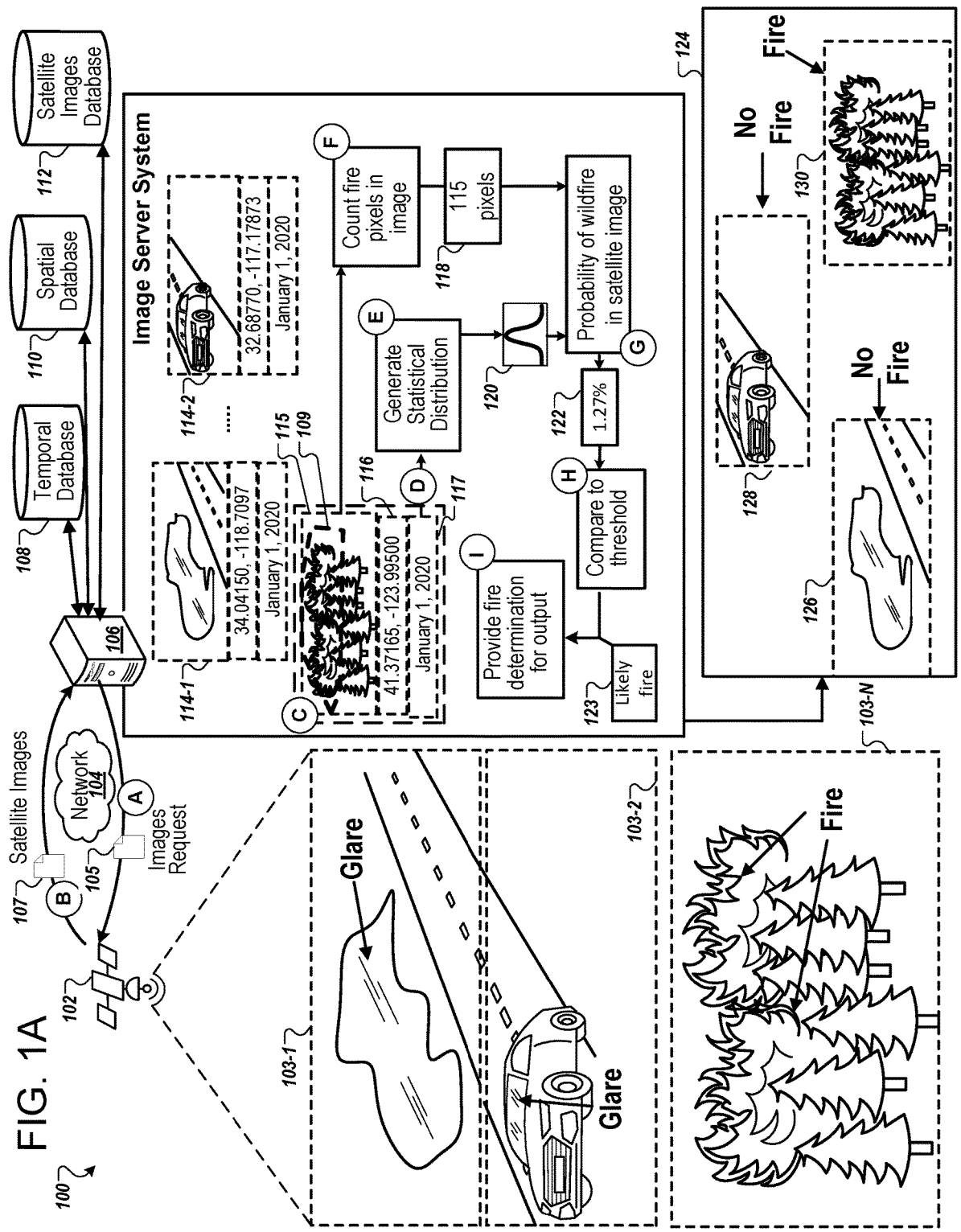
FIG. 1A is a block diagram that illustrates an example of a system for identifying wildfire in satellite imagery.

FIG. 1A is a block diagram that illustrates an example of a system for identifying wildfire in satellite imagery. The system 100 includes an image server system 106, a satellite images database 112, a temporal database 108, and a spatial database 110. The system 100 can also include a monitor connected to the image server system 106, such as display 124, for displaying the indication of whether satellite imagery illustrates wildfire and enabling a user to interact with the image server system 106. Briefly, the system 100 can determine whether satellite imagery illustrates wildfire based on a date when the satellite imagery was captured, the satellite imagery, and a corresponding location illustrated in the satellite imagery. The system 100 can generate a statistical distribution and compare the satellite imagery to the generated statistical distribution to make the wildfire determination.

The system 100 seeks to determine whether satellite imagery illustrates wildfire because typically satellite imagery includes noise that may be confused with wildfire. For example, the noise in satellite imagery may not only indicate wildfire, but can also indicate glare. Glare, which can appear to be similar to wildfire in satellite imagery, can reflect off windshields of vehicles, windows of residential and commercial properties, and can reflect off lakes, rivers, oceans, and other water filled geographic regions. To a satellite and other systems, glare and wildfire may appear similar. The image server system 106 can apply statistical techniques and other measures to the satellite imagery to differentiate glare from wildfire and differentiate wildfire from other naturally occurring phenomena that may be indistinguishable to wildfire.

In some implementations, the image server system 106 may include one or more servers or computers connected locally or over a network. The system 100 can include a network 104 that can be, for example, a local network, a Wi-Fi network, an intranet, an Internet connection, a Bluetooth connection, a satellite network, or some other connection that enables the image server system 106 to communicate, e.g., transmit and receive, with various databases, various computers, and other various components. FIG. 1A illustrates various operations in stages (A) through (I) which can be performed in the sequence indicated or another sequence.

The image server system 106 may also communicate with a satellite 102 over a satellite network. The satellite may capture media, e.g., images and videos, of geographic regions of the Earth. The image server system 106 may communicate with the satellite to request for and receive media captured of various geographic regions of the Earth. This will be further described below.

In some implementations, the satellite images database 112 can include one or more databases that store satellite imagery illustrating one or more geographic regions of the Earth. The satellite imagery may include high quality satellite images, medium quality satellite images, noisy satellite imagery, and other satellite imagery. Moreover, the satellite images database 112 can store satellite imagery illustrating one or more geographic regions of the Earth over a period of time. For example, the satellite imagery can include media, e.g., images and video, of a particular geographic region of the Earth over the past 1, 5, 10, 15, or more years previous from a current time. The satellite images database 112 can include satellite imagery for each day over the past time period. In some cases, the satellite images database 112 can include multiple images or multiple videos from each day of the geographic region.

The satellite images database 112 can store satellite media for multiple geographic regions of the Earth over various periods of time. For example, the satellite images database 112 can store satellite imagery for geographic region 1 through geographic region N, and store satellite imagery for various periods of time for each of those geographic regions. In these examples, the satellite images database 112 can store satellite imagery for each day of the past 10 years for geographic region 1 and satellite imagery for each day of the past 20 years for geographic region 2.

In some implementations, the dimensions of the satellite imagery may correspond to the camera utilized on the satellite 102 and the positional location of the satellite 102. The satellite 102 may navigate the circumference of the Earth at a particular distance from the Earth and capture imagery of the Earth from that distance. For example, satellites may navigate in low orbit around the Earth at a distance of 800 kilometers (km) or 497.097 miles from the Earth. In some implementations, the cameras associated with the satellites may have a zoom capability.

In some implementations, the resolution of the satellite cameras may be set to a standard resolution to ensure uniformity across all satellite imagery. For example, the resolution of the cameras may be set to 375 meters horizontally and vertically when capturing geographic regions of the Earth. In other implementations, different satellites may have different resolution capabilities. As such, the satellite cameras can adjust their zoom capability to ensure resolution uniformity across satellite imagery from each of the satellites.

In the some implementations, the temporal database 108 can include one or more databases that store time periods of satellite imagery captured by the satellite and stored in the satellite images database 112. The time periods can include, for examples, defined dates, date ranges, and time ranges. For example, the temporal database 108 can store a time range of Jan. 1, 2018 to Jan. 1, 2019 or a time range of 12:00 PM on Jan. 1, 2018 to 12:01 PM on Jan. 1, 2019.

Moreover, the temporal database 108 can store further specific date ranges. The more specific date ranges can include specificities down in the hour and minute range. For example, the temporal database 108 can store time ranges of Jan. 1, 2018 at 12:00 PM to Jan. 1, 2019 at 12:30 PM.

In some implementations, the satellite 102 can provide satellite imagery to the satellite images database 112 with metadata. The metadata can include locational data of the geographic region where the satellite imagery was captured, data identifying the satellite that captured the satellite imagery, a date and time when the satellite imagery was captured, and locational data indicating where the satellite was located in space when capturing the satellite imagery. For example, if the satellite 102 captured an image of a geographic region in Washington D.C., then the satellite 102 can associate the following metadata with the image: (1) locational data of the geographic region as 38.89773, −77.03653, (2) a date of Jun. 19, 2020 at 1:55 PM PT, when the satellite image was captured, (3) data indicating the name and model of the satellite that captured the imagery, e.g., SATELLITE111 and Model 2, (4) locational data of the satellite when the image was captured, such 800 km above the locational coordinates of 38.89773, −77.03653. The satellite images database 112 can match the date and location of the wildfire provided by the image server system 106 to the metadata of the satellite imagery to identify requested satellite imagery.

The image server system 106 can distribute the metadata to each of the databases in system 100, accordingly. For example, when the satellite provides the satellite imagery to the image server system 106, the image server system 106 can provide the satellite imagery and the metadata to the satellite images database 112 for storage purposes. Additionally, the image server system 106 can extract the temporal data from the metadata and provide the temporal data to the temporal database 108. The temporal data can indicate the day and time at which the satellite image was captured by the satellite 102. Additionally, the image server system 106 can extract the locational data of the geographic region from the metadata and provide the locational data to the spatial database 110. The image server system 106 can perform this extraction and distribution process for each satellite image obtained from the satellite.

In some implementations, the spatial database 110 can include one or more databases that store locational data of locations identified in satellite imagery captured by the satellite and stored in the satellite images database 112. The locational data can include, for example, latitude and longitude coordinates, addresses, names of landmarks, and dates that identify cities, states, counties, and other data that identifies locations on the Earth.

The spatial database 110 can include one or more bounding boxes that illustrate a location of an area, e.g., a geographic region or coordinates, which illustrates a wildfire in the satellite imagery. The bounding box may include a polygon, for example, that illustrates the geographic region where the wildfire burns or an area around the geographic region where the wildfire burns. The bounding box may be applied to the satellite imagery so that the image server system 106 can determine where to count the fire pixels. For example, as will be further described below, the image server system 106 can count the number of fire pixels within the bounding box applied to the satellite imagery.

Within the polygon may include one or more geographic features and one or more features of a wildfire. For example, the one or more features of the wildfire can include one or more regions that have not been on fire, one or more regions that are actively on fire, one or more burned regions that were recently on fire, and one or more scarred regions that resulted from fires. The spatial database 110 can be populated by the image server system 106 or another external service.

The image server system 106 can store data in the temporal database 108 and the spatial database 110 in response to the image server system 106 obtaining satellite imagery. In some implementations, the image server system 106 can store temporal and spatial data from the metadata of the satellite imagery to ensure that the satellite images database 112 can provide the proper satellite images when requested. In this case, if the image server system 106 requests for satellite imagery outside of the data included within the temporal database 108 and the spatial database 110, then the satellite images database 112 may return an error message indicating that the requested data is outside of the satellite imagery range.

In some implementations, processes external to the image server system 106 may perform the population of the satellite images database 112, the temporal database 108, and the spatial database 110. In this case, the image server system 106 may perform processes related to determining whether satellite imagery illustrates wildfire by accessing the temporal database 108, the spatial database 110, and the satellite images database 112.

During stage (A), the image server system 106 may transmit a request 105 to the satellite 102 over the network 104. The request 105 can indicate to the satellite 102 to capture one or more satellite images of a geographic region on the Earth. The request 105 may include locational coordinates, e.g., latitude and longitudinal coordinates, of an area to capture one or more images as the satellite 102 navigates around the Earth.

During stage (B), the satellite 102 can capture one or more satellite images of the geographic region provided by the request 105. The satellite 102 may include one or more satellite cameras for capturing satellite imagery. For example, as illustrated in the system 100, the geographic region that the satellite 102 is instructed to capture can include a lake, a roadway of driving vehicles, forests, geographical regions with fire and smoke, and other areas. Other geographical regions can include more, less, or different geographical features than those illustrated in system 100.

The satellite 102 can capture satellite imagery of the requested geographical region. For example, the satellite 102 can capture multiple images. The multiple images can include satellite imagery 103-1 that illustrates a lake, a portion of a roadway, and other geographical features. The multiple images can also include satellite imagery 103-2 and 103-3. The satellite imagery 103-2 can illustrate a portion of a roadway, a field, one or more vehicles driving on the roadway, and other geographical features. The satellite imagery 103-3 can illustrate a forest that is currently on fire and includes smoke.

Each of the satellite imagery, e.g., 103-1 through 103-3, may correspond to areas proximate to one another in a geographic region. In some implementations, the image server system 106 may instruct the satellite 102 to capture satellite imagery of multiple geographic regions on Earth that are not proximate to one another. For example, the image server system 106 may instruct the satellite 102 to traverse north along the east coast of the United States and capture various regions between North Carolina and Pennsylvania.

The satellite may navigate over the requested geographic region or regions on a daily basis, and as such, be able to provide satellite imagery of the requested one or more geographic regions on a day-to-day basis. In some implementations, the satellite 102 may capture the geographic region in multiple images, multiple videos, or both per day. In this case, the image server system 106 may be able to view multiple satellite images and videos on one day, a different set of multiple satellite images and videos on the next day, and so on.

In some implementations, the one or more geographic regions captured by a satellite camera can include one or more locations associated with wildfire. For example, the one or more locations associated with the wildfire can include one or more regions that have not been on fire, one or more regions that are actively on fire, one or more burned regions that were recently on fire, and one or more scarred regions that resulted from fires. As illustrated in system 100, the one or more locations associated with wildfire in the geographic region can include one or more regions that have not been on fire, e.g., locations within satellite imagery 103-1 and 103-2, one or more regions that are actively on fire, e.g., locations within satellite imagery 103-N, one or more burned regions that were recently on fire, and one or more scarred regions that resulted from fires.

Additionally, the satellite imagery from 103-1 and 103-2 can both include glare. The glare in satellite imagery 103-1 can be reflected off a surface of the lake. The glare in satellite imagery 103-2 is reflected off a windshield of a vehicle. The glare may be caused by sunlight, lights illuminating the roadway, flashlights, or other manmade and non-man made sources of light.

The satellite 102 can transmit the captured media of the satellite imagery 103-1, 103-2, and 103-N (collectively "satellite imagery 103") in package 107 to the image server system 106 over the network 104. In some implementations, the satellite 102 may transmit the captured media of the satellite imagery 103 in package 107 directly to the satellite images database 112 and directly bypass the image server system 106. In this case, at a later point in time, the image server system 106 can obtain data identifying the captured satellite imagery 103 to (i) identify wildfire in the captured satellite imagery 103 and/or (ii) build a statistical distribution using the captured satellite imagery 103 among other images. The package 107 can include the satellite imagery 103, data identifying the satellite 102, metadata associated with each of the satellite imagery 103, timestamp information, and data identifying any processing performed by the satellite on the satellite imagery 103. The processing can include, for example, digital signal processing techniques to reduce an amount of statistical noise found in the satellite imagery 103.

During stage (C), the image server system 106 can obtain satellite imagery data 114-N and determine whether wildfire is illustrated in the satellite imagery data 114-N. In particular, the satellite imagery data 114-N can include a satellite imagery 115, a location 116 that illustrates a geographic location shown in the satellite imagery 115, and a date 117 indicating when the satellite 102 captured the satellite imagery 115. The location within each satellite imagery data may also include other descriptors such as, for example, names of landmarks, names of cities, names of geographical regions, or specific addresses.

In some implementations, an external process may access the temporal database 108, the spatial database 110, and the satellite images database 112, to obtain the satellite imagery data 114-N. The external process can include another application executing on the image server system 106 or another application or process executing on an external server. In some implementations, a user may interact with the image server system 106 and may request the image server system 106 to determine whether the satellite imagery 115 illustrates wildfire. Additionally, the user may interact with the image server system 106 and may request the image server system 106 to determine whether multiple images illustrate wildfire, e.g., the satellite image in satellite imagery data 114-1 and the satellite image in satellite imagery data 114-2.

For example, the satellite imagery data 114-N can include the satellite imagery 115 that corresponds to the satellite imagery 103-N captured by the satellite 102. The location 116 can include locational coordinates of 41.37165, −123.99500 and the date 117 captured can indicate Jan. 1, 2020. The satellite imagery data 114-1 can include the satellite imagery that corresponds to the satellite imagery 103-1 captured by the satellite 102. The location within the satellite imagery data 114-1 can include locational coordinates of 34.04150, −118.7097 and the date captured can indicate Jan. 1, 2020. The satellite imagery data 114-2 can include the satellite imagery that corresponds to the satellite imagery 103-2 captured by the satellite 102. The location within the satellite imagery data 114-2 can include locational coordinates of 32.68770, −117.17873 and the date captured can indicate Jan. 1, 2020. The image server system 106 can also obtain other previously captured satellite imagery data for processing.

In some implementations, the image server system 106 may retrieve a polygon from the spatial database 110 that indicates a location where the wildfire occurred in the satellite imagery 115. The image server system 106 can obtain the polygon based on the date 117 and the location 116 associated with the satellite imagery 115. To limit the amount of processing performed by the image server system 106, the image server system 106 can crop the obtained polygon to the obtained satellite imagery 115 after obtaining the satellite imagery. In this case, the polygon can spatially restrict the number pixels searched over by the image server system 106 in the satellite imagery 115. The polygon can be a box or multi-sided region that encompasses one or more pixels that illustrate wildfire in the satellite imagery. For example, as illustrated in system 100, the image server system 106 can crop a polygon 109 to a region in the satellite imagery 115 where wildfire has likely occurred.

In some implementations, the image server system 106 can obtain satellite imagery from the satellite images database 112 to build the statistical distribution. For example, the image server system 106 can provide the date 117 and the location 116 associated with the satellite imagery data 114-N to the satellite images database 112 to obtain satellite imagery at the location and a time period range prior to the date 117. In some implementations, the image server system 106 can indicate to the satellite images database 112 a time period prior to the date 117 for obtaining satellite imagery. The time period can include, for example, one year prior to the date 117, two years prior to the date 117, five years prior to the date 117, or some other time period prior to the date 117 that is sufficient to build the statistical distribution. For example, the image server system 106 may require at least one year of satellite imagery prior to the date 117 for building the statistical distribution, and consequently, request two years or more of satellite imagery from the satellite images database 112 prior to the date 117.

In some implementations, the satellite images database 112 can index its stored satellite imagery by location. For example, the image server system 106 can additionally provide the location 116 to the satellite images database 112 and the satellite images database 112 can access the satellite imagery that include the location 116, e.g., locational coordinates or another geographical or locational description, in its field of view. The satellite images database 112 can determine the location 116 in the field of view of corresponding satellite imagery by analyzing the metadata of the satellite imagery.

Then, the satellite images database 112 can filter those images that include the location 116 by a temporal range. For example, the satellite images database 112 can exclude or filter out those satellite images that have timestamps and dates after the date 117 and exist outside the time period prior to the date 117. For example, the image server system 106 can indicate to the satellite images database 112 to provide all satellite imagery showing the location 116 from two years prior to the Jan. 1, 2020 date, e.g., Jan. 1, 2018, to Jan. 1, 2020. The image server system 106 can exclude all satellite imagery showing the location 116 prior to the Jan. 1, 2018 date and after the Jan. 1, 2020 date.

The satellite images database 112 can identify and provide the identified satellite imagery that meets the image server system 106's criteria back to the image server system 106. The identified satellite imagery can include one or more images or videos of satellite imagery including the location 116 and have a timestamp falling in the temporal range of two years prior to the date 117, for example. In some examples, the identified satellite imagery may include satellite imagery for each day from Jan. 1, 2018 to Jan. 1, 2020 or may include multiple satellite images or videos for each day from Jan. 1, 2018 to Jan. 1, 2020. In some cases, one or more of the days between Jan. 1, 2018 and Jan. 1, 2020 may not include satellite imagery if the satellite did not capture imagery around the location 116 on those days.

In some implementations, each media of the satellite imagery data 114 can include a specified resolution. For example, each media may include a resolution of 325 meters in the horizontal direction and 325 meters in the vertical direction. This resolution enables the image server system 106 not only to visually inspect the location 116 but also the areas surrounding the location 116. As wildfires can originate in a specific location and move to another location, by viewing a wide area proximate to the location 116, such as in a bounding box or polygon around the location 116, the image server system 106 can improve its determination of whether wildfire exists in the satellite imagery. For example, the bounding box or polygon can correspond to an area or region with the satellite imagery that indicates an area encompassing the wildfire. The bounding box can include the smallest area that covers wildfire within the satellite imagery or an area that encompasses both the wildfire and outside the wildfire.

Additionally, if the location 116 falls on an edge of the identified satellite imagery, the satellite images database 112 can also provide satellite imagery adjacent to the location 116 in the edged satellite image. In this case, the image server system 106 can ensure that the location 116 shown in the satellite image is always surrounded by an area of imagery, e.g., image resolution, even in the case that the location 116 lands on an edge, e.g., vertical or horizontal, of the satellite imagery. In some implementations, the image server system 106 may indicate to the satellite images database 112 a bounding region or an area around the location 116. Then, as the satellite images database 112 identifies satellite imagery that meet the criteria of the image server system 106, the satellite images database 112 can identify additional satellite imagery to provide if the originally identified satellite imagery does not fall within the criteria of the bounding region or area.

In some implementations, the satellite images database 112 can provide the identified satellite imagery to the image server system 106 over a network. In other implementations, the satellite images database 112 can provide the indexes of the identified satellite imagery to the image server system 106 for performing the retrieval of the satellite imagery. In some cases, the satellite images database 112 can also provide a link to the identified satellite imagery for quick retrieval by the image server system 106. The link can include, for example, a zip file, access to cloud storage, or some other form for download of the satellite imagery.

During stage (D), the image server system 106 can provide the satellite imagery data 114-N for generating the statistical distribution. Additionally, the image server system 106 can provide the identified satellite imagery obtained from the satellite images database 112 for generating the statistical distribution. The image server system 106 can generate the statistical distribution based on the identified satellite imagery and the satellite imagery data 114-N.

During stage (E), the image server system 106 can generate a statistical distribution 120 based on the identified satellite imagery and the satellite imagery data 114-N. In some implementations, the image server system 106 can generate the statistical distribution 120 for comparison to satellite imagery 115 to determine a likelihood of wildfire in the satellite imagery 115. In particular, the statistical distribution 120 can correspond to a frequency model of satellite noise in a particular geographic region over a period of time. In some examples, the frequency model can be based on a Normal distribution, a Gaussian distribution, or a Poisson distribution.

In some implementations, the satellite imagery identified from the satellite images database 112 can illustrate various landmarks, buildings, roads, and other geographic features. The other geographic features can include, for example, rivers, oceans, lakes, hills, flat lands. The satellite imagery can also illustrate people, vehicles, animals, and other features commonly found in geographic regions. The satellite imagery can also include noisy characteristics, such as glare, glint, and distorted pixels.

In some implementations, the satellite imagery can illustrate various regions of fire. These regions can include, for example, one or more regions that have not been on fire, one or more regions that are actively on fire, one or more burned regions that were recently on fire, and one or more scarred regions that resulted from fires. Regions that have not been on fire can show one more geographic regions that have been untouched by fire. Regions that are actively burning can include, for example, regions that illustrate active fire, smoke, or embers. Burned regions that were recently on fire can illustrate geographic regions in which the fire once burned but is no longer active but those geographic regions are still hot and dangerous. Scarred regions can illustrate geographic regions in which once burned but is no longer active and those geographic regions are no longer hot or dangerous.

The image server system 106 can generate and utilize the statistical distribution 120 to improve the accuracy of the detection of wildfire in the satellite imagery 115. In particular, the image server system 106 can initiate the process of comparing satellite imagery 115 to a generated statistical distribution 120 by first identifying a number of pixels in the satellite imagery 115 that appear to illustrate wildfire. Some of the identified pixels may not illustrate wildfire and rather, illustrate noisy pixels. To mitigate this issue, the image server system 106 can compare the number of pixels identified in the satellite imagery 115 that appear to illustrate wildfire to the generated statistical distribution 120 to filter out the imagery with the noisy characteristics.

To be able to make such a comparison, the image server system 106 can build the statistical distribution 120 with historical satellite imagery obtained from the satellite images database 112 that illustrates the same location as location 116 that does not illustrate ongoing wildfire. For example, the image server system 106 must first identify a period of time previous to the date 117 within the identified satellite imagery from the satellite images database 112 that does not illustrate wildfire. In addition to identifying a date three months prior to the date 117 that ensures no wildfire is no found in corresponding satellite imagery, the image server system 106 can identify historical weather reports and other climate databases to confirm whether fire existed in certain geographic regions, such as the geographic region identified in the satellite imagery. By generating a satellite imagery baseline, the image server system 106 can identify any pixels in satellite imagery that are outside the norm of the baseline and indicate that the corresponding satellite imagery appears to illustrate wildfire. In this case, the image server system 106 first determines a date three months prior to the date 117. For the example of system 100, the date three months prior to the date 117 is Oct. 1, 2019.

The image server system 106 can determine the date three months prior to the date 117 because generally, wildfires do not last longer than three months. By identifying a date that is three months prior to the date 117, the image server system 106 can safely assume that the any potential wildfire identified by data from the satellite imagery data 114-N is not active or has not been lit in the corresponding satellite imagery, e.g., satellite imagery of the date three months prior to the date 117. In some implementations, if the image server system 106 identifies wildfire still occurring in the identified satellite imagery from the satellite images database 112 at the date three months prior to the date 117, the image server system 106 may identify an even earlier date. In some cases, the image server system 106 can identify whether one or more other wildfires were active during the time period between the date 117 and the date three months prior to the date 117. The one or more other wildfires can correspond to wildfires that have different origins and did not cause the wildfire identified by the date 117. The image server system 106 can access one or more public wildfire databases to determine if another wildfire was active during this time window. However, the occurrence of another wildfire being active in the same geographic region as the wildfire potentially identified by the satellite imagery data 114-N is rare.

For example, the image server system 106 may move the date from Oct. 1, 2019 back one month to, e.g., Sep. 1, 2019. If the image server system 106 determines no pixels in the identified satellite imagery on the date of Sep. 1, 2019 appear to illustrate wildfire, then the image server system 106 can set Sep. 1, 2019 as an end date for the time range to build the statistical distribution. The image server system 106 can perform the process of identifying the end date for the time range iteratively, e.g., continuing to move back a day, a month, or a week until a start date with no wildfire is illustrated in the corresponding satellite imagery.

In some implementations, the image server system 106 can determine a date one year prior to the determined end date for the time range. The date one year prior to the determined end date for the time range is known as the start date for the time range. The image server system 106 can identify the start date and the end date of the time range for identifying satellite imagery to build the statistical distribution 120. Continuing with the example of system 100, the image server system 106 can determine the start date for the time range to be Oct. 1, 2018, e.g., one year prior to the end date of Oct. 1, 2019.

However, for the image server system 106 to set the start date to be Oct. 1, 2018, the image server system 106 can use data from an external database of historical fires to ensure no satellite imagery illustrating the location 116 illustrates active wildfire between the start date, e.g., Oct. 1, 2018, and the end date, e.g., Oct. 1, 2019. If the image server system 106 identifies data from the external database of historical fires that indicates wildfire existed or was active in the geographic region from Oct. 1, 2018 to Oct. 1, 2019, for example, then the image server system 106 can adjust the start date or the end date accordingly. The manner in which the image server system 106 detects or identifies ongoing wildfire in the satellite imagery will be further described below.

For determining whether the satellite imagery within the time range illustrates ongoing wildfire, the image server system 106 may identify the number of fire pixels in the satellite image and compare the number of fire pixels to a threshold value. For example, the image server system 106 may execute a fire detection algorithm on the satellite image to determine how many pixels include fire. The fire detection algorithm can include, for example, an active fire detection algorithm. If the number of fire pixels in a satellite image is less than the threshold value, then the image server system 106 can indicate that the particular satellite image does not include fire.

For example, the image server system 106 can select a subset of satellite imagery from the identified satellite imagery from the satellite images database 112 between Oct. 1, 2018 and Oct. 6, 2019, inclusive. The image server system 106 can process each image or video from each day in that time range and search for pixels that appear to illustrate wildfire. If the image server system 106 detects pixels appearing to illustrate wildfire on Oct. 4, 2018, e.g., the number of pixels being greater than the threshold, and on no other days, then the image server system 106 can adjust the time range to Oct. 5, 2018 to Oct. 1, 2019. Alternatively, if the image server system 106 detects pixels appearing to illustrate wildfire on Oct. 1, 2019, e.g., the number of pixels being greater than the threshold, then the image server system 106 can adjust the time range to Oct. 1, 2018 to Sep. 31, 2019.

In some cases, if the image server system 106 detects pixels appearing to illustrate wildfire in the middle of the time range, such as on Dec. 1, 2018 or Nov. 1, 2018, e.g., the number of pixels being greater than the threshold, then the image server system 106 can drop those days from the time range and adjust the time range to multiple continuous sub-time ranges. For example, the continuous sub-time ranges can include Oct. 1, 2018-Oct. 31, 2018 to Nov. 2, 2018-Nov. 31, 2018 to Dec. 2, 2018-Oct. 1, 2019. Thus, the image server system 106 can create a single continuous time range or multiple continuous sub-time ranges for building the satellite imagery distribution.

In some implementations, the image server system 106 can determine a date nine months prior to the date three months behind the date 117. For example, if the image server system 106 determines that the satellite imagery at the date of Oct. 1, 2019 does not appear to illustrate wildfire, then the image server system 106 can identify a date nine months prior to the Oct. 1, 2019 date for the start of the time range. The end date of the time range becomes Oct. 1, 2019. The date nine months prior to the Oct. 1, 2019 date corresponds to Jan. 1, 2019. Thus, the image server system 106 can build the statistical distribution 120 based on the time range of Jan. 1, 2019 to Oct. 1, 2019.

The image server system 106 can generate a statistical distribution 120 more quickly and save on processing speed/power if the image server system 106 bases the statistical distribution 120 on the shorter nine-month time range, e.g., Jan. 1, 2019 to Oct. 1, 2019. However, the image server system 106 can generate a more accurate and representative statistical distribution 120 of the location 116 if the image server system 106 bases the statistical distribution 120 on the longer one year time range, e.g., Oct. 1, 2018 to Oct. 1, 2019. In some examples, typically, wildfires can occur in certain regions, e.g., California area, during a standard three-month fire season beginning around August and September. For fires that occur during this fire season, a nine-month window can be selected, instead of the one-year window, to decrease the likelihood that satellite imagery is selected that accidentally includes wildfire from the previous year's fire season in the baseline distribution. In some implementations, the image server system 106 can remove the fire season from the satellite imagery corresponding to the time range to decrease the chance a fire is accidentally included in the time range or the baseline distribution.

In response to identifying the satellite imagery in the identified time range from the identified satellite imagery from the satellite images database 112, the image server system 106 can determine a number of pixels on each day in the identified satellite imagery that appear to illustrate wildfire. For example, the image server system 106 can analyze the satellite imagery on each day between the identified time range of Oct. 1, 2018 to Oct. 1, 2019 and determine a number of fire pixels on each day. In some implementations, the image server system 106 can apply the retrieved polygons from the spatial database 110 to identified satellite imagery. By cropping the polygons to the identified satellite imagery, which indicate the locations of where the wildfire initiated, the image server system 106 can reduce the amount of pixels searched over in the identified satellite imagery. In this case, the image server system 106 can search over pixels in the identified satellite imagery within the retrieved polygon.

The image server system 106 may count 100 fire pixels on Oct. 1, 2018, 111 fire pixels on October 2, and continue counting satellite imagery for each day until Oct. 1, 2019, for example. The same process holds true in the case of analyzing the satellite imagery in the one-year time range or a time range that has multiple continuous sub-time ranges. The image server system 106 can count the number of fire pixels or pixels that appear to illustrate wildfire using the fire detection algorithm, for example.

In some implementations, the image server system 106 can normalize the number of fire pixels detected for each day. For example, the image server system 106 may analyze one satellite image for Oct. 1, 2018, analyze one hundred satellite images for Oct. 2, 2018, and thirty satellite images for Oct. 3, 2018. The image server system 106 can divide the number of fire pixels detected for each day by the number of satellite images to normalize the detections. The reason for normalizing is to ensure that the generated statistical distribution 120 creates a smooth curve. If the values are not normalized, then the curve of the generated distribution 120 may include jagged edges and skew the probability predictions.

In some implementations, after determining the number of fire pixels for each day in the satellite imagery or within the polygon of the satellite imagery of the identified time range, the image server system 106 can generate the statistical distribution 120. For example, the image server system 106 can generate a frequency histogram of the number of pixels identified in the satellite imagery that appear to illustrate ongoing wildfire. The frequency histogram can be illustrated in a graphical representation, the number of days on the X-axis and the number fire pixels in the Y-axis.

The image server system 106 can then determine the mean of the frequency histogram and fit the mean or other data descriptors, such as standard deviation, to a statistical distribution. For example, the image server system 106 can fit the mean of the frequency histogram to a Poisson distribution or another statistical distribution. In a Poisson distribution, the mean is equivalent to the variance. In the case of system 100, the average number of pixels identified to illustrate wildfire in a given time interval, e.g., one year, is equivalent to the variance of the Poisson distribution.

In some implementations, if a significant amount of wildfire occurs in the baseline distribution, the baseline distribution or statistical distribution may no longer have an equivalent mean and variance. In other words, the baseline distribution may no longer follow a Poisson distribution. In this case, the image server system 106 can perform a test that determines whether the mean and variance for the baseline distribution, e.g., statistical distribution 120, is equivalent. The test is performed by analyzing the mean of samples in the statistical distribution 120 and analyzing the variance of the samples, for example. If the image server system 106 detects the mean and variance for the statistical distribution 120 is not equivalent, then the image server system 106 can adjust the time range and corresponding satellite imagery and build a new statistical distribution 120 based on the satellite imagery from the adjusted time range. The image server system 106 can repeat this process until a statistical distribution 120 is built that has an equivalent mean and variance. Once the statistical distribution 120 is built, only one parameter, such as the mean number of pixels that appear to illustrate wildfire, is required to determine the probability of the event. The following equation illustrates the probability distribution function for a Poisson random variable:

$$f(k; \lambda) = \frac{\left(\lambda^k * e^{-\lambda}\right)}{k!} \quad (1)$$

In Equation 1 above showing the Poisson distribution, the value A corresponds to the average number of pixels appearing to illustrate wildfire from the baseline. The value k corresponds to a random variable or the number of times an event occurs, e.g., the number of pixels appearing to illustrate wildfire from an input image. The resultant value, f(k; λ), corresponds to a probability representative of the Poisson probability distribution function. In some implementations, the image server system 106 can return the Poisson distribution once the value A has been determined.

The Poisson distribution can provide a resultant value during the comparison with an input image, the resultant value indicating a likelihood that an event is to occur in a given time period. In particular, the probability density function (PDF) of the Poisson distribution can return a probability that a particular day with k counted pixels occurred naturally from the distribution of noise. Thus, the lower the value output by the PDF, the more likely an external force, e.g., a wildfire, contributed to the count of the k value. Alternatively, the higher the value output by the PDF, the less likely an external force contributed to the count of the k value, and an indication that the image more closely resembles that from the baseline distribution. For example, if the probability corresponds to a low value, such as 0.01, then the image server system 106 can determine that the image likely illustrates wildfire. Alternatively, if the probability corresponds to a high value, such as 0.95, then the image server system 106 can determine that the image likely does not illustrate ongoing wildfire. In some implementations, the image server system 106 can use the cumulative density function (CDF) instead of the PDF of the Poisson distribution to generate a probability.

During stage (F), the image server system 106 can determine a number of pixels in the satellite imagery 115 that appear to illustrate wildfire. In some implementations, the image server system 106 can use a fire detection algorithm to determine whether a pixel illustrates wildfire. In some implementations, the image server system 106 can analyze a number of pixels within the polygon 109 of the satellite imagery 115 to reduce the amount of pixels searched over for reduced processing by the fire detection algorithm. In other implementations, the image server system 106 can analyze a pixel's brightness to determine whether a pixel illustrates wildfire. For example, the image server system 106 may determine the number of pixels that appear to illustrate wildfire in the satellite imagery 115 on Jan. 1, 2020 by analyzing each pixel's brightness and comparing the pixel's brightness to a threshold value. For example, the image server system 106 can determine a pixel's brightness by averaging the red, blue, and green (RGB) values of a pixel. In some implementations, the image server system 106 can analyze wavelengths outside of RGB values to determine which pixels are on fire. For example, the wavelengths outside of RGB can include infrared wavelengths. The lower the average, the less bright the pixel and vice versa. In another example, the image server system 106 can determine a pixel's brightness by calculating the relative luminance value using the following formula:

$$Y = 0.2126 * R + 0.7152 * G + 0.0722 * B \quad (2)$$

Equation 2 above illustrates calculating a relative luminance value for a pixel based on the pixel's RGB values. For example, if a pixel's red value is 100, green value is 100, and blue value is 100, then the relative luminance value is 100. The greater the relative luminance value, the greater the brightness of the pixel. Although, the brightness of the pixel does not indicate whether the pixel illustrates wildfire or noise, the brightness of the pixel can be an indication that a pixel appears to be on fire. In some implementations, the image server system 106 can also analyze an intensity of the pixel to determine whether wildfire exists in the pixel. In other implementations, the image server system 106 can rely on external sources to determine whether a corresponding pixel illustrates wildfire. For example, the image server system 106 can utilize a Visible Infrared Imaging Radiometer Suite (VIIRS) Active Fire Product that was developed by NASA to determine where a pixel was or was not on fire by combining the infrared band from the satellite imagery with the RGB bands of the pixel. Typically, each satellite includes their own detection algorithm that is optimized for the specifications of the corresponding equipment.

In some implementations, the image server system 106 can apply the polygon obtained from the spatial database 110 to the satellite imagery on the particular day. The image server system 106 can determine the number of pixels that appear to illustrate wildfire within the polygon of the satellite imagery on Jan. 1, 2020 by analyzing each pixel's brightness or intensity and comparing the pixel's brightness to a threshold value. By incorporating the polygon on the satellite imagery, the image server system 106 can reduce processing complexity and decrease processing time because a smaller amount of pixels in the satellite imagery is searched.

The image server system 106 can calculate the brightness for each pixel in the satellite imagery of Jan. 1, 2020 or within the polygon applied to the satellite imagery of Jan. 1, 2020. Then, for each pixel, the image server system 106 can compare the brightness of each pixel to a threshold value. For example, the image server system 106 can designate a threshold value of 50 or another brightness value. If a particular pixel of the satellite imagery is greater than the threshold value, then the image server system 106 can deem that pixel to be included in the count. The image server system 106 repeats this process for each pixel of the satellite image.

In some implementations, the image server system 106 can identify pixels that illustrate wildfire within the satellite imagery 115. Contextually, the pixels that can illustrate wildfire can correspond to regions within the polygon, e.g., regions that are actively on fire and potentially burned regions that were recently on fire. If the burned regions that were recently on fire include one or more embers from the fire, the image server system 106 may detect and identify pixels associated with those embers in the satellite imagery as pixels being on fire. However, pixels associated with regions that have not been on fire and scarred regions that resulted from fire will not be detected by the image server system 106 as illustrating fire.

For example, as illustrated in system 100, the image server system 106 can determine that the satellite imagery 115 includes 115 pixels that appear to illustrate wildfire. The image server system 106 can provide for output 118 the 115 pixels that appeared to illustrated wildfire to the generated statistical distribution 120.

During stage (G), the image server system 106 can determine a probability that satellite imagery 115 illustrates wildfire by providing the number of pixels that appear to illustrate wildfire as an input to the generated statistical distribution 120. For instance, the image server system 106 can input the counted number of pixels in the satellite imagery 115 into the value k of Equation 1 of the Poisson distribution, e.g., the statistical distribution 120. For example, the image server system 106 may have fit the frequency histogram to a Poisson distribution and determined the following equation:

$$f(k; 100) = \frac{(100^k * e^{-100})}{k!} \qquad (3)$$

As illustrated in Equation 3, the number one hundred in place for value A, which corresponds to the average number of pixels appearing to illustrate wildfire from the baseline distribution each day. Moreover, the value A can describe a wideness of the Poisson distribution curve. Equation 3 represents a probability density function or a continuous probability density function of the Poisson distribution of the statistical distribution 120. The value k corresponds to the number of pixels found in the satellite image of Jan. 1, 2020 that appear to illustrate wildfire. For example, the pixel count for the particular image corresponds to a value of 115, Equation 3 would result with the following value:

$$f(115; 100) = \frac{(100^{115} * e^{-100})}{115!} = 0.01272 \qquad (4)$$

As shown in Equation 4, the image server system 106 calculated a probability of 1.272% that the event of one hundred fifteen fire pixels is likely to occur in the baseline distribution. Moreover, the calculation probability indicates the number of events, e.g., fire pixels, that occurred in the satellite imagery on a single day, e.g., Jan. 1, 2020, with respect to the known average rate of fire pixels occurring over one year, e.g., Oct. 1, 2018 to Oct. 1, 2019, as determined from the baseline distribution. As illustrated in system 100, the image server system 106 determines a probability 122 of 1.27%.

In some implementations, the calculated probability can correspond to a metric that is a proxy for the probability that the satellite image is not on fire. Given the proxy, the image server system 106 can determine whether the satellite image illustrates wildfire depending on a side of the threshold the likelihood falls. If the likelihood is greater, then the likelihood can indicate the satellite image illustrates wildfire. Alternatively, if the likelihood is smaller, then the likelihood can indicate the satellite image does not illustrate wildfire.

During stage (H), the image server system 106 can compare the output probability to a threshold value to determine whether the satellite imagery 115 of Jan. 1, 2020 has a similar number of fire pixels to the baseline distribution. For example, the image server system 106 may set the threshold value to be 5% or 6%. If the image server system 106 determines that the probability 122 is less than the threshold value, then the image server system 106 can determine that the satellite imagery 115 likely illustrates a fire. Alternatively, if the image server system 106 determines that the output probability is greater than the threshold value, then the image server system 106 can determine that the satellite imagery 115 does not illustrate fire. As illustrated in system 100, the image server system 106 provided an output 123 that indicates the satellite imagery 115 likely includes fire based on the comparison of the probability 122 to the threshold value.

In some implementations, the image server system 106 can perform the processes of stages (C) through (H) for each of satellite imagery data 114-1, satellite imagery data 114-2, and satellite imagery data 114-N. The image server system 106 can collectively save in memory the output 123 and the data used by the image server system 106 to make this determination. For example, the image server system 106 can save in memory the output 123, the corresponding probability 122, the generated statistical distribution 120, the output 118 indicating the number of pixels counted in the satellite imagery 115, and the satellite imagery data 114-N. The image server system 106 can save off this data for each satellite imagery data 114 to help improve future fire detections in satellite imagery. For example, if the image server system 106 determines that a future satellite imagery data includes a similar distribution and count of fire pixels to a previously stored statistical distribution and count of fire pixels, respectively, then the image server system 106 may provide a quick result indicating fire or no fire in the future satellite imagery data without performing any additional processing based on the previous result.

During stage (I), the image server system 106 can provide the output 123 for output. For example, as illustrated in system 100, the image server system 106 can provide the output 123 and the corresponding satellite imagery 115 to a display 124 connected to the image server system 106. The output display 130 on the display 124 illustrates that the satellite imagery 115 likely illustrates wildfire. Similarly, the image server system 106 can generate a resultant output for the corresponding satellite imagery data 114-1 and generate a resultant output for the corresponding satellite imagery data 114-2. Then, the image server system 106 can provide both resultant outputs and their respective satellite images to the display 124. As illustrated in system 100, the output display 126 on display 124 illustrates that the satellite imagery associated with satellite imagery data 114-1 does not illustrate wildfire. Similarly, the output display 128 on display 124 illustrates that the satellite imagery associated with satellite imagery data 114-2 does not illustrate wildfire.

In some implementations, the image server system 106 can provide the indications of whether satellite imagery illustrates wildfire to one or more internal or external pipelines. The internal pipelines can be, for example, different machine learning models as training data or as data to provide to different machine learning models to generate analyses for different wildfire predictions. The different machine learning models can perform applications, such as, wildfire identification from future satellite images, detecting wildfire in real time from satellite images, and identifying wildfire origin. In other examples, the indication whether satellite imagery illustrates wildfire to different processes that determine a historical length or severity of wildfires that burn in a particular region.

Other internal pipelines can include, for example, one or more graphical user interfaces (GUIs) of a geographic region that illustrates one or more satellite images stitched together to illustrate multiple regions that may or may not include wildfire based on the process identified in system 100. With the GUI, an external user can review the GUI and make determinations about whether to notify authorities about a potentially detected wildfire in real-time or in case individuals want to analyze reasons as to why certain geographic locations may be more inclined to wildfires than others geographic locations. The external pipelines can be, for example, other external systems that perform wildfire detection in satellite imagery, remotely monitoring climate crises, such as wildfire, and external programs that monitor forestry and their growth. In other examples, the external pipelines can correspond to functionality to ensure the satellites are operating properly, or to assess the accuracy of the satellite and fire detection algorithm. In other examples, the external pipelines can include wildfire monitoring for the benefit of first responders, e.g., firefighters, or civilians.

The image server system 106 can also provide the output 123 for the corresponding satellite imagery 115 to one or more external devices over a network. For example, the image server system 106 may provide the output 123 to a client device, such as a mobile device, a personal handheld device, a tablet, or another client device, for reviewing whether provided satellite imagery includes wildfire or not. The client device can provide another satellite imagery for the image server system 106 to process in response to receiving the indication of whether the previous satellite imagery illustrates wildfire.

Figure 1B:
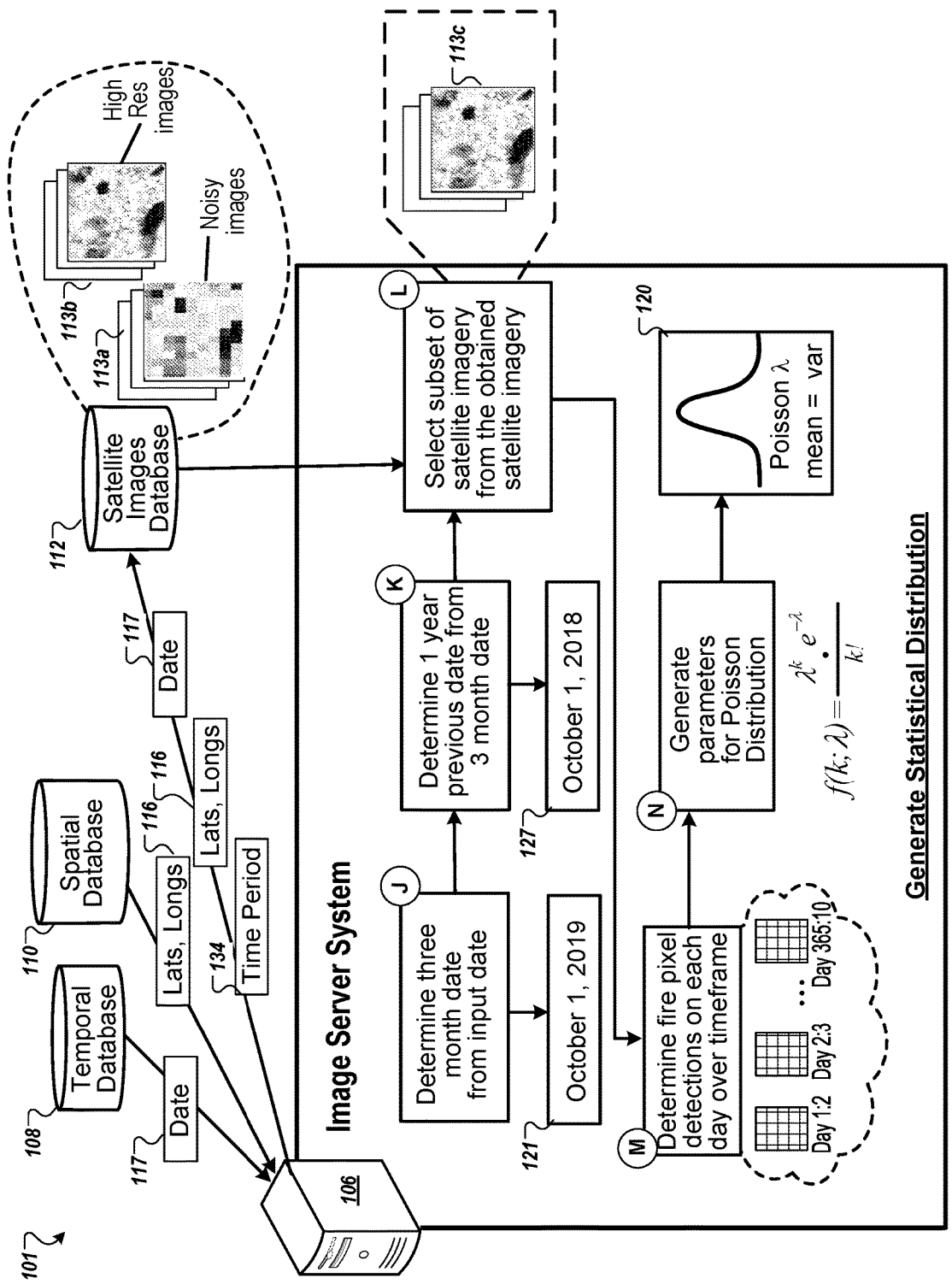
FIG. 1B is a block diagram that illustrates an example of a system for generating a statistical distribution when determining whether satellite imagery illustrates wildfire.

FIG. 1B is a block diagram that illustrates an example of a system 101 for generating a statistical distribution when determining whether satellite imagery illustrates wildfire. The system 101 illustrates the processes performed during stage (E) from system 100. The system 101 illustrates the generation of a Poisson distribution, but other distributions may be generated by system 101. FIG. 1B illustrates various operations in stages (J) through (N) which can be performed in the sequence indicated or another sequence.

In some implementations, the system 101 illustrates the processes for generating the statistical distribution. The image server system 106 can generate the statistical distribution to be a Poisson distribution, a Normal distribution, or a Gaussian distribution, to name a few examples. The process for generating the statistical distribution generally includes, among other things: (i) identify a first date that is three months prior to the provided date; (ii) identify a second date that is one year or nine-months prior to the first date; (iii) select a subset of satellite imagery from the obtained satellite imagery based on the time range between the first and second date; (iv) determine a mean, a standard deviation, and other statistical characteristics of fire pixels from the subset of satellite imagery; and, (v) generate the statistical distribution based on the statistical characteristics of fire pixels from the subset of satellite imagery.

During stage (J), the image server system 106 can determine a first date 121 that is three months prior to the provided date associated with the satellite imagery. For example, the image server system 106 can determine the first date 121 to be Oct. 1, 2019 in the case that the provided date of the satellite imagery corresponds to a date of Jan. 1, 2020, as illustrated in system 100. The image server system 106 identifies a date three months prior to the provided date to ensure that when building the baseline imagery, the baseline imagery for the statistical distribution is free from and does not include fire pixels.

During stage (K), the image server system 106 can determine a second date 127 that is one year prior to the first date 121. For example, the image server system 106 can determine the second date 127 to be Oct. 1, 2018 in the case that the first date 121 corresponds to Oct. 1, 2019. In some implementations, the image server system 106 can determine a second date 127 that is nine months prior to the first date 121. For example, the image server system 106 can determine the second date 127 to be Jan. 1, 2019 for the nine month time window.

During stage (L), the image server system 106 can select a subset of satellite imagery from the obtained satellite imagery. As illustrated in system 101, the image server system 106 can obtain a location 116 of a geographic region shown in the satellite imagery 115 and a date 117 when the satellite imagery 115 was captured by satellite 102. The date can be, for example, a string indicating Jan. 1, 2020 and the location can be a string or numbers indicating latitude and longitudinal coordinates of 41.37165, −123.99500 E. This stage is similar to stage (C) from system 100.

Then, the image server system 106 can request satellite imagery from the satellite images database 112 by providing the date 117, the location 116, and a time period 134. The time period 134 can indicate, for example, a period of time prior to the date 117 for obtaining satellite imagery. For example, the time period 134 may indicate a period of time of 1 year, 3 years, 5 years, or another length of time sufficient to build a statistical distribution.

The satellite images database 112 can include satellite images that illustrate various geographic regions of the Earth. For example, the satellite images may include high-resolution images 113b, noisy images 113a, and other types of images, such as infrared video and other media.

In some implementations, the image server system 106 can obtain the satellite imagery and select a subset of satellite imagery from the obtained satellite imagery. For example, as illustrated in system 101, the image server system 106 can select the satellite imagery 113c from the obtained satellite imagery. The satellite imagery 113c can include set of satellite imagery showing high resolution images, noisy resolution images, low resolution images, satellite video, and other satellite media. The image server system 106 can select the satellite imagery 113c based on an time period identified in stages (J) and (K) of system 101, one or more time ranges that avoid fire pixel detection in the set of satellite imagery, and other criteria.

During stage (M), the image server system 106 can determine fire pixel detections on each day over the identified time range. This stage is similar to stage (F) from system 100. For example, the image server system 106 can analyze each satellite imagery from the satellite imagery 113c and determine a number of pixels on each day in the set of satellite imagery that appear to illustrate wildfire. For example, the image server system 106 can analyze the satellite imagery 113c on each day between the identified time range of Oct. 1, 2018 to Oct. 1, 2019 and determine a number of fire pixels on each day. In another example, the image server system 106 can analyze within the polygon of the satellite imagery 113c between each day of Oct. 1, 2018 to Oct. 1, 2019 and determine a number of fire pixels on each day within the polygon. The image server system 106 may count five fire pixels on Oct. 1, 2018, three fire pixels on October 2, and continue counting satellite imagery for each day until Oct. 1, 2019, for example.

During stage (E), in response to determining the number of fire pixels for each day in the satellite imagery 113c, the image server system 106 can generate the statistical distribution. For example, the image server system 106 can generate the one or more parameters for the statistical distribution, which may be a Poisson distribution, such as the mean and the variance of the distribution. In the case the statistical distribution is a Poisson distribution, the image server system 106 can determine an average number of pixels from the set of satellite imagery 113c that appear to illustrate fire. In this case, the average number of pixels identified that appear to illustrate wildfire over the identified time range may be five, for example, and this value is equivalent to the variance of the Poisson distribution. In response to identifying the average and fitting the mean of the fire pixel detection in the satellite imagery, the image server system 106 can provide the statistical distribution 120 for various applications.

Figure 2:
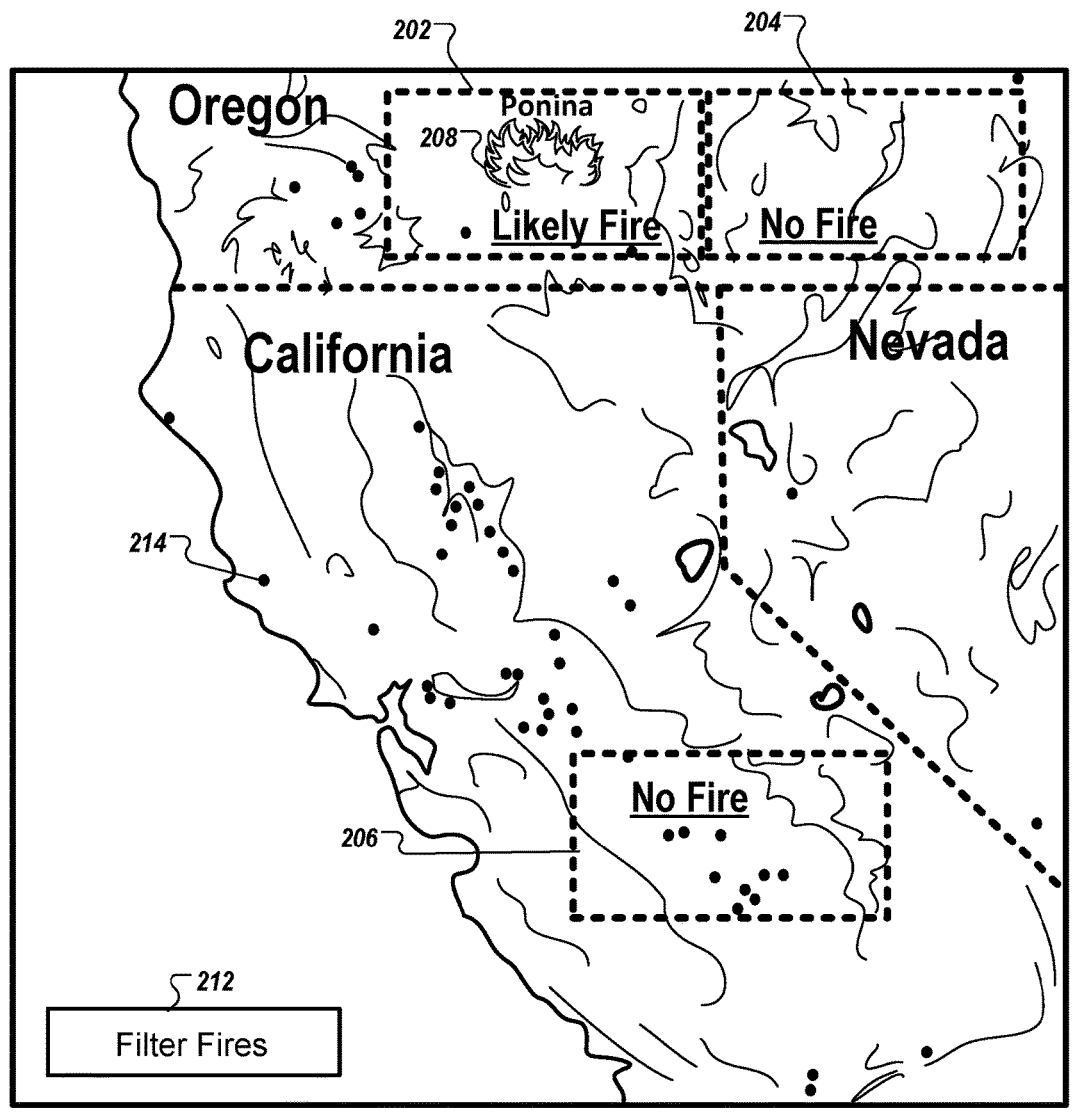
FIG. 2 is an example graphical user interface that illustrates a likelihood of wildfire identified in one or more geographical regions.

FIG. 2 is an example graphical user interface (GUI) 200 that illustrates a likelihood of wildfire identified in one or more geographical regions. For example, the GUI 200 illustrates one or more geographical regions in California, Oregon, and Nevada. An image server system, such as image server system 106, may receive satellite imagery for various geographic regions illustrated in the GUI 200. The image server system can process each of the satellite imagery for the various geographic regions to determine whether wildfire exists in the satellite imagery using the processes described in systems 100 and 101.

In response to determining whether satellite imagery illustrates wildfire, the image server system can provide the satellite imagery and corresponding wildfire determination to the GUI 200 for display. The image server system can stitch together the satellite imagery and their corresponding wildfire determinations for an external reviewer to analyze. For example, as illustrated in the GUI 200, the image server system can process satellite imagery 202, satellite imagery 204, and satellite imagery 206 and make determinations about whether these satellite imagery illustrate wildfires. Then, the image server system can provide the following to the GUI 200: the satellite imagery 202 with a determination that wildfire is illustrated in satellite imagery 202, the satellite imagery 204 with a determination that wildfire is not illustrated in satellite imagery 204, and the satellite imagery 206 with a determination that wildfire is not illustrated in satellite imagery 206. This determination is also evident in the GUI 200—the satellite imagery 202 illustrates wildfire 208, and the satellite imagery 204 and 206 do not illustrate wildfire.

In some implementations, the GUI 200 may include a button 212 that illustrates filter fires. The button 212 can be a GUI button that a user can interact with to toggle on or off fire determination in the satellite images. For example, should an external user select the button 212 to toggle on, the GUI 200 can illustrate one or more regions of various satellite imagery that indicate "Likely Fire" or "No Fire," as illustrated in system 200. Additionally, the GUI 200 can highlight regions by dotted boxes when the toggle is on, such as the boxes illustrated in 202, 204, and 206. When the button 212 is toggled in the off position, the descriptions of "Likely Fire" or "No Fire" and the dotted boxes are removed from the GUI 200.

In other implementations, toggling on the button 212 can result in a description added below the dots illustrated on the GUI 200. For example, the GUI 200 may illustrate the dots, such as dot 214, which can illustrate a possible wildfire in that geographic region. However, as previously mentioned, satellite imagery can include noise characteristics, which can make it difficult to determine whether wildfire actually exists in the satellite imagery. For example, noise characteristics can include characteristics such as glare, glint, and other bright lights that may confuse existing systems from detecting wildfire. Some satellite noise may be more noisier in geographic regions than others. The glare and glint may reflect off windshields of car windows, windows of houses, windows of buildings, the surface of rivers, lakes, and oceans, and other shiny objects. The glare and glint can give off the indication to the satellite that a wildfire is occurring, when in fact, the glare and glint illustrate noise and not wildfire in the satellite images.

By toggling the button 212 to the on state, the image server system can process the satellite imagery, e.g., satellite imagery 202, 204, and 206, using the processes described with respect to systems 100 and 101 to differentiate wildfire from other types of noise illustrated in satellite imagery. The image server system can provide those indications or descriptions of "Likely Fire" or "No Fire" to the display near the dots.

Figure 3:
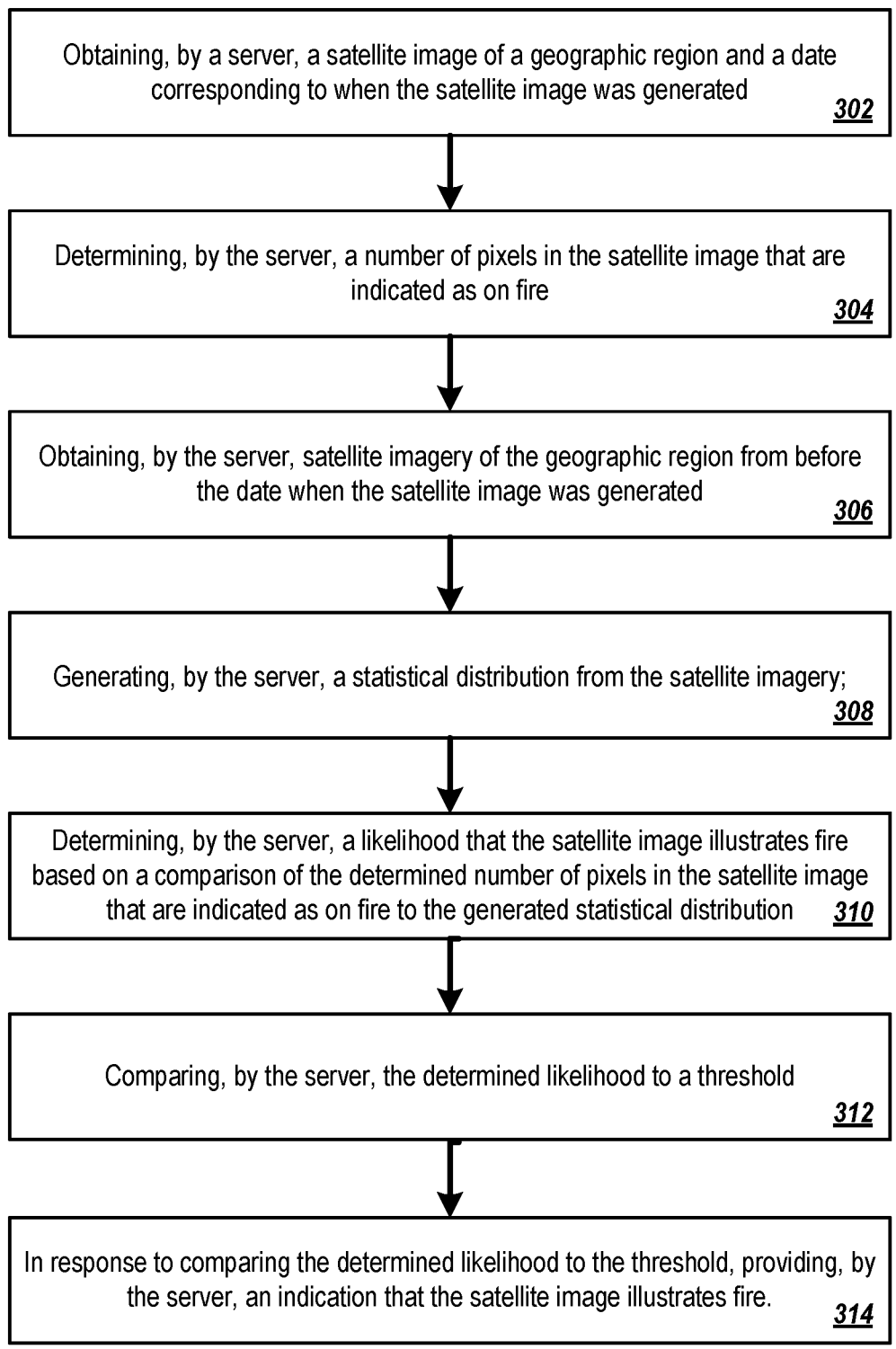
FIG. 3 is a flow diagram that illustrates an example of a process for identifying wildfire in satellite imagery.

FIG. 3 is a flow diagram that illustrates an example of a process 300 for identifying wildfire in satellite imagery. The image server system 102 of system 100 can perform the process 100.

The image server system can obtain a satellite image of a geographic region and a date corresponding to when the satellite image was generated (302). For example, the image server system can obtain the satellite image from an external server or process and the date when a satellite captured the satellite image.

The image server system can determine a number of pixels in the satellite image that are indicated as on fire (304). The image server system can determine the number of pixels in the satellite image that are indicated as on fire based on a fire detection algorithm executing over one or more pixels within a bounding box cropped on the satellite image. Alternatively or in addition to, the image server system can determine the number of pixels within the bounding box in the satellite image that are indicated as on fire based on comparing an intensity value for each pixel to a second threshold value. In response to determine a set number of pixels within the bounding box that are each greater than the second threshold value or as indicated by the fire detection algorithm, the image server system can identify the set number of pixels as pixels illustrating wildfire in the obtained satellite image.

The image server system can obtain satellite imagery of the geographic region from before the date when the satellite image was generated (306). For instance, the image server system can obtain a location that describes the geographic region. In response, the image server system can provide the location that describes the geographic region and the date corresponding to when the satellite image was generated to a satellite images database. In response to providing the location and the date to the satellite images database, the image server system can obtain the satellite imagery that illustrates the geographic region from a time period prior to the date.

The image server system can generate a statistical distribution from the satellite imagery (308). The image server system can select a subset of satellite imagery from the obtained satellite imagery. For example, the image server system can select the subset of satellite imagery by identifying a time period to generate the statistical distribution and select the subset of imagery from the satellite imagery based on the time period. The image server system can determine an indication if one or more pixels from the subset of satellite imagery illustrates fire. In response, the image server system can adjust the subset of satellite imagery by comparing the one or more pixels that illustrates fire to a threshold value if one or more satellite imagery of the subset of satellite imagery illustrates fire.

In some implementations, the image server system can generate one or more parameters of the statistical distribution once the subset of satellite imagery has been refined to avoid fire pixels. The image server system can generate the one or more parameters by determining a number of pixels on each day of the subset of satellite imagery that illustrates fire. Then, the image server system can determine an average of the number of pixels on each day of the subset of satellite imagery that illustrate fire. In response, the image server system can generate the statistical distribution by setting the determined average to the one or more parameters. For example, the image server system can set the determined average to the mean and variance of a Poisson distribution to generate the Poisson distribution. A probability density function (PDF) or a cumulative density function (CDF) of the Poisson distribution or other distributions may be generated.

The image server system can determine a likelihood that the satellite image illustrates fire based on a comparison of the determined number of pixels in the satellite image that are indicated as on fire to the generated statistical distribution (310). For example, the image server system can determine the likelihood or a likelihood proxy that the satellite image illustrate fire by providing data representing the set number of pixels as pixels illustrating wildfire in the obtained satellite image as input to the generated statistical distribution. In particular, the generated statistical distribution can output a probability that a satellite image which was not on fire to have exactly k noisy fire pixels. Said another way, the output probability can indicate that a satellite image is not on fire or indicate that a satellite image is on fire. Here, either the PDF or the CDF of the generated statistical distribution may be used.

The image server system can compare the determined likelihood to a threshold (312). For example, in response to comparing the determined likelihood to the threshold, the image server system can determine whether the satellite image illustrates wildfire depending on a side of the threshold the likelihood lies. If the likelihood is higher than the threshold, the image server system can indicate the satellite image illustrates wildfire. Alternatively, if the likelihood is lower than the threshold, the image server can indicate the satellite image does not illustrate wildfire.

In response to comparing the determined likelihood to the threshold, the image server system can provide an indication that the satellite image illustrates fire (314). Alternatively, the image server can also provide an indication that the satellite image does not illustrate fire. For example, the image server system can provide the satellite image and the corresponding indication that the satellite image illustrates fire to a graphical user interface (GUI) on a display, the GUI illustrating multiple satellite images stitched together over various geographical regions with one or more indications of fire pixels in the multiple satellite images. The satellite image and the corresponding indication that the satellite image illustrates fire, or no fire, can also be provided to other internal or external pipelines.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   obtaining, by a server, a first image illustrating a geographic region and a first date corresponding to when the first image was generated;
   obtaining, by the server, a second image illustrating the geographic region at a second date, the second date being prior to the first date;
   determining, by the server, whether the second image illustrates fire;
   in response to determining that the second image does not illustrate fire, obtaining, by the server, imagery of the geographic region over a prior time period from before the second date;
   determining, by the server, a sub-set of pixels in each image of the imagery, each pixel in the sub-set of pixels determined to meet a threshold probability of representing fire;
   generating, by the server, a statistical distribution over the prior time period using the sub-set of pixels in each image of the imagery; and
   providing, by the server, the generated statistical distribution for assessing images that one of illustrate and do not illustrate fire for the geographic region.

2. The computer-implemented method of claim 1, wherein obtaining the first image illustrating the geographic region and the first date corresponding to when the first image was generated comprises:
   obtaining, by the server, a location that describes the geographic region;
   providing, by the server and to a satellite images database, the location that describes the geographic region and the first date corresponding to when the first image was generated; and
   in response to providing the location and the first date to the satellite images database, obtaining, by the server, the first image that illustrates the geographic region and the first date corresponding to when the first image was generated.

3. The computer-implemented method of claim 1, wherein the second date is at least three months prior to the first date.

4. The computer-implemented method of claim 1, wherein determining whether the second image illustrates fire comprise one or more of:
   determining, by the server, a number of pixels in the second image that are indicated as illustrating fire based on a fire detection algorithm executing over one or more pixels within a bounding box cropped on the second image; or
   determining, by the server, the number of pixels within the bounding box in the second image that are indicated as on fire based on comparing an intensity value for each pixel to a threshold value; and
   in response to determining a set number of pixels from the number of pixels within the bounding box including a corresponding intensity value that is greater than the threshold value, identifying, by the server, the set number of pixels as pixels illustrating fire in the second image.

5. The computer-implemented method of claim 4, further comprising:
   determining, by the server, the second image does illustrate fire;
   setting, by the server, an image as the second image;
   setting, by the server, a temporary date as the second date;
   while the image does illustrate fire:
      in response to determining the image does illustrate the fire, obtaining, by the server, another image illustrating the geographic region at another date, the other date being prior to the temporary date;
      determining, by the server, whether the other image illustrates fire;
      setting, by the server, the image as the other image; and
      setting, by the server, the temporary date as the other date; and
   in response to determining that the other image does not illustrate fire, obtaining, by the server, the imagery of the geographic region over the prior time period from before the other date.

6. The computer-implemented method of claim 1, wherein obtaining the imagery of the geographic region over the prior time period from before the second date comprises obtaining, by the server, the imagery of the geographic region one year prior to the second date, the imagery comprises one or more satellite images from each day one year prior to the second date, and the obtained imagery does not illustrate fire.

7. The computer-implemented method of claim 1, wherein generating the statistical distribution over the prior time period using the sub-set of pixels in each image of the imagery, each pixel in the sub-set of pixels determined to meet the threshold probability of representing the fire comprises:
   generating, by the server, one or more parameters of the statistical distribution by:
      determining, by the server, the sub-set of pixels in each image of the imagery that that is determined to meet the threshold probability of representing the first;
      determining, by the server, an average of the sub-set of pixels in each image of the imagery that meets the threshold probability of representing the fire; and
      generating, by the server, the statistical distribution by setting the determined average to the one or more parameters.

8. The computer-implemented method of claim 1, wherein the statistical distribution is a normal distribution, a gaussian distribution, or a Poisson distribution.

9. A system comprising:
   one or more computers and one or more storage devices storing instructions that are operable, when executed by the one or more computers, to cause the one or more computers to perform operations comprising:
      obtaining, by a server, a first image illustrating a geographic region and a first date corresponding to when the first image was generated;
      obtaining, by the server, a second image illustrating the geographic region at a second date, the second date being prior to the first date;
      determining, by the server, whether the second image illustrates fire;

in response to determining that the second image does not illustrate fire, obtaining, by the server, imagery of the geographic region over a prior time period from before the second date;

determining, by the server, a sub-set of pixels in each image of the imagery, each pixel in the sub-set of pixels determined to meet a threshold probability of representing fire;

generating, by the server, a statistical distribution over the prior time period using the sub-set of pixels in each image of the imagery; and providing, by the server, the generated statistical distribution for assessing images that one of illustrate and do not illustrate fire for the geographic region.

10. The system of claim 9, wherein obtaining the first image illustrating the geographic region and the first date corresponding to when the first image was generated comprises:

obtaining, by the server, a location that describes the geographic region;

providing, by the server and to a satellite images database, the location that describes the geographic region and the first date corresponding to when the first image was generated; and in response to providing the location and the first date to the satellite images database, obtaining, by the server, the first image that illustrates the geographic region and the first date corresponding to when the first image was generated.

11. The system of claim 9, wherein the second date is at least three months prior to the first date.

12. The system of claim 9, wherein determining whether the second image illustrates fire comprise one or more of:

determining, by the server, a number of pixels in the second image that are indicated as illustrating fire based on a fire detection algorithm executing over one or more pixels within a bounding box cropped on the second image; or determining, by the server, the number of pixels within the bounding box in the second image that are indicated as on fire based on comparing an intensity value for each pixel to a threshold value; and in response to determining a set number of pixels from the number of pixels within the bounding box including a corresponding intensity value that is greater than the threshold value, identifying, by the server, the set number of pixels as pixels illustrating fire in the second image.

13. The system of claim 12, further comprising:

determining, by the server, the second image does illustrate fire;

setting, by the server, an image as the second image;

setting, by the server, a temporary date as the second date;

while the image does illustrate fire:

in response to determining the image does illustrate the fire, obtaining, by the server, another image illustrating the geographic region at another date, the other date being prior to the temporary date;

determining, by the server, whether the other image illustrates fire;

setting, by the server, the image as the other image; and setting, by the server, the temporary date as the other date; and in response to determining that the other image does not illustrate fire, obtaining, by the server, the imagery of the geographic region over the prior time period from before the other date.

14. The system of claim 9, wherein obtaining the imagery of the geographic region over the prior time period from before the second date comprises obtaining, by the server, the imagery of the geographic region one year prior to the second date, the imagery comprises one or more satellite images from each day one year prior to the second date, and the obtained imagery does not illustrate fire.

15. The system of claim 9, wherein generating the statistical distribution over the prior time period using the sub-set of pixels in each image of the imagery, each pixel in the sub-set of pixels determined to meet the threshold probability of representing the fire comprises:

generating, by the server, one or more parameters of the statistical distribution by:

determining, by the server, the sub-set of pixels in each image of the imagery that that is determined to meet the threshold probability of representing the first;

determining, by the server, an average of the sub-set of pixels in each image of the imagery that meets the threshold probability of representing the fire; and generating, by the server, the statistical distribution by setting the determined average to the one or more parameters.

16. The system of claim 9, wherein the statistical distribution is a normal distribution, a gaussian distribution, or a Poisson distribution.

17. A non-transitory computer-readable medium storing software comprising instructions executable by one or more computers which, upon such execution, cause the one or more computers to perform operations comprising:

obtaining, by a server, a first image illustrating a geographic region and a first date corresponding to when the first image was generated;

obtaining, by the server, a second image illustrating the geographic region at a second date, the second date being prior to the first date;

determining, by the server, whether the second image illustrates fire;

in response to determining that the second image does not illustrate fire, obtaining, by the server, imagery of the geographic region over a prior time period from before the second date;

determining, by the server, a sub-set of pixels in each image of the imagery, each pixel in the sub-set of pixels determined to meet a threshold probability of representing fire;

generating, by the server, a statistical distribution over the prior time period using the sub-set of pixels in each image of the imagery; and providing, by the server, the generated statistical distribution for assessing images that one of illustrate and do not illustrate fire for the geographic region.

18. The non-transitory computer-readable medium of claim 17, wherein obtaining the first image illustrating the geographic region and the first date corresponding to when the first image was generated comprises:

obtaining, by the server, a location that describes the geographic region;

providing, by the server and to a satellite images database, the location that describes the geographic region and the first date corresponding to when the first image was generated; and in response to providing the location and the first date to the satellite images database, obtaining, by the server, the first image that illustrates the geographic region and the first date corresponding to when the first image was generated.

19. The non-transitory computer-readable medium of claim 17, wherein the second date is at least three months prior to the first date.

20. The non-transitory computer-readable medium of claim 17, wherein determining whether the second image illustrates fire comprise one or more of:
- determining, by the server, a number of pixels in the second image that are indicated as illustrating fire based on a fire detection algorithm executing over one or more pixels within a bounding box cropped on the second image; or
- determining, by the server, the number of pixels within the bounding box in the second image that are indicated as on fire based on comparing an intensity value for each pixel to a threshold value; and
- in response to determining a set number of pixels from the number of pixels within the bounding box including a corresponding intensity value that is greater than the threshold value, identifying, by the server, the set number of pixels as pixels illustrating fire in the second image.

* * * * *